United States Patent
Jacobi et al.

(10) Patent No.: US 7,615,741 B2
(45) Date of Patent: Nov. 10, 2009

(54) DETERMINING ORGANIC CARBON DOWNHOLE FROM NUCLEAR SPECTROSCOPY

(75) Inventors: David J. Jacobi, The Woodlands, TX (US); John M. Longo, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 96 days.

(21) Appl. No.: 11/769,353

(22) Filed: Jun. 27, 2007

(65) Prior Publication Data

US 2008/0179509 A1    Jul. 31, 2008

Related U.S. Application Data

(60) Provisional application No. 60/817,497, filed on Jun. 29, 2006.

(51) Int. Cl.
*G01V 5/08* (2006.01)
(52) U.S. Cl. .................................. 250/269.1
(58) Field of Classification Search ... 250/269.1–269.8, 250/268
See application file for complete search history.

(56) References Cited

U.S. PATENT DOCUMENTS

| | | | |
|---|---|---|---|
| 2,943,200 A * | 6/1960 | Rickard | 376/274 |
| 4,071,755 A | 1/1978 | Supernaw et al. | 250/253 |
| 4,390,783 A | 6/1983 | Grau | 250/270 |
| 4,394,574 A | 7/1983 | Grau et al. | 250/262 |
| 4,585,939 A | 4/1986 | Arnold et al. | 250/256 |
| 4,686,364 A | 8/1987 | Herron | 250/256 |
| 4,691,772 A * | 9/1987 | Ebenhack et al. | 166/250.02 |
| 4,712,424 A | 12/1987 | Herron | 73/152 |
| 5,045,693 A * | 9/1991 | McKeon et al. | 250/269.7 |
| 5,440,118 A * | 8/1995 | Roscoe | 250/269.6 |
| 5,471,057 A | 11/1995 | Herron | 250/269.9 |
| 6,704,656 B1 * | 3/2004 | Abriol et al. | 702/6 |
| 6,972,564 B2 | 12/2005 | Chen et al. | 324/303 |
| 2002/0150194 A1* | 10/2002 | Wielopolski et al. | 376/160 |
| 2003/0006768 A1* | 1/2003 | Kleinberg et al. | 324/303 |

OTHER PUBLICATIONS

Seewald, "Organic-inorganic interactions in petroleum-producing sedimentary basins," 2003, Nature. vol. 426. pp. 327-333.*
Wielopolski et al., "Soil carbon measurements using inelastic neutron scattering," 2000, IEEE Transactions on nuclear science, vol. 47., No. 3, pp. 914- 917.*

(Continued)

*Primary Examiner*—Constantine Hannaher
*Assistant Examiner*—Kiho Kim
(74) *Attorney, Agent, or Firm*—Madan & Sriram, P.C.

(57) ABSTRACT

Elemental analysis of an earth formation is obtained using measurements from a gamma ray logging tool. From the elemental analysis, an estimate of the Calcium, Magnesium and Carbon content of the formation is determined. The amount of organic carbon in the formation is estimated from the total Carbon content and the inorganic carbon associated with minerals in the formation. An indication of source rock may be obtained from the Th/U ratio.

23 Claims, 5 Drawing Sheets

OTHER PUBLICATIONS

Schumacher, "Methods for the determination of total organic carbon (TOC) in soils and sediments," Apr. 2002, US Environmental Protection Agency.*

Westaway et al.; *Neutron-Induced Gamma Ray Spectroscopy for Reservoir Analysis*, SPE 9461, 1983 Society of Petroleum Engineers of AIME, Jun. 1983, pp. 553-564, 12 Figs.

Adams et al.; *Thorium-To-Uranium Ratiios as Indicators fo Sedimentary Processes: Example of Concept of Geochemical Facies*, Bulletin of the American Association of Petroleum Geologists, vol. 42, No. 2 (Feb. 1958), pp. 387-430, 18 Figs.

Hertzog, *Laboratory and Field Evaluation of an Inelastic-Neutron-Scattering and Capture Gamma Ray Spectroscopy Tool*, SPE 7430, 53rd Annual Fall Technical Conference and Exhibition of the Society of Petroleum Engineers of AIME, Houston, Texas, Oct. 1-3, 1978, pp. 1-14, 18 Figs.

* cited by examiner

DETERMINING ORGANIC CARBON DOWNHOLE FROM NUCLEAR SPECTROSCOPY

CROSS-REFERENCES TO RELATED APPLICATIONS

This application claims priority from U.S. Provisional Patent Application Ser. No. 60/817497 filed on Jun. 29, 2006. This application is also related to an application entitled "Use of Thorium-Uranium Ratio as an Indicator of Hydrocarbon Source Rock" having the same inventors and being filed concurrently with the present application under Ser. No. 11/769,129.

BACKGROUND OF THE DISCLOSURE

1. Field of the Disclosure

The present disclosure is in the field of gamma ray testing of geological formations. In particular, the disclosure determines the organic carbon content of a formation from recorded spectra.

2. Description of the Related Art

Well logging systems have been utilized in hydrocarbon exploration for many years. Such systems provide data for use by geologists and petroleum engineers in making many determinations pertinent to hydrocarbon exploration and production. In particular, these systems provide data for subsurface structural mapping, defining the lithology of subsurface formations, identifying hydrocarbon-productive zones, and interpreting reservoir characteristics and contents. Many types of well logging systems exist which measure different formation parameters such as conductivity, travel time of acoustic waves within the formation and the like.

One class of systems seeks to measure incidence of nuclear particles on the well logging tool from the formation for purposes well known in the art. These systems take various forms, including those measuring natural gamma rays from the formation. Still other systems measure gamma rays in the formation caused by bursts of neutrons into the formation by a neutron source carried by the tool and pulsed at a preselected interval.

In these nuclear well logging systems, reliance is made upon the physical phenomenon that the energies of gamma rays given off by nuclei resulting from natural radioactive decay or induced nuclear radiation are indicative of the presence of certain elements within the formation. In other words, formation elements will react in predictable ways, for example, when high-energy neutrons on the order of 14.2 MeV collide with the nuclei of the formation elements. Different elements in the formation may thus be identified from characteristic gamma ray energy levels released as a result of this neutron bombardment. Thus, the number of gamma rays at each energy level will be functionally related to the quantity of each element present in the formation, such as the element carbon, which is present in hydrocarbons. The presence of gamma rays at a 2.2 MeV energy level may for example, indicate the presence of hydrogen, whereas predominance of gamma rays having energy levels of 4.43 and 6.13 MeV, for example, may indicate the presence of carbon and oxygen respectively.

In these nuclear well logging systems, it is frequently useful to obtain data regarding the time spectral distributions of the occurrence of the gamma rays. Such data can yield extremely valuable information about the formation, such as identification of lithologies that are potentially-hydrocarbon producing. Moreover, these desired spectral data may not only be limited to that of natural gamma rays, for example, but also may be desired for the gamma ray spectra caused by bombardment of the formation with the aforementioned pulsed neutron sources.

Well logging systems for measuring neutron absorption in a formation use a pulsed neutron source providing bursts of very fast, high-energy neutrons. Pulsing the neutron source permits the measurement of the macroscopic thermal neutron absorption capture cross-section $\Sigma$ of a formation. The capture cross-section of a reservoir rock is indicative of the porosity, formation water salinity, and the quantity and type of hydrocarbons contained in the pore spaces.

The measurement of neutron population decay rate is made cyclically. The neutron source is pulsed for 20-40 microseconds to create a neutron population. Neutrons leaving the pulsed source interact with the surrounding environment and are slowed down. In a well logging environment, collisions between the neutrons and the surrounding fluid and formation atoms act to slow these neutrons. Such collisions may impart sufficient energy to these atoms to leave them in an excited state, from which after a short time gamma rays are emitted as the atom returns to a stable state. Such emitted gamma rays are labeled inelastic gamma rays. As the neutrons are slowed to the thermal state, they may be captured by atoms in the surrounding matter. Atoms capturing such neutrons are also caused to be in an excited state, and after a short time gamma rays are emitted as the atom returns to a stable state. Gamma rays emitted due to this neutron capture reaction are labeled capture gamma rays. In wireline well logging operations, as the neutron source is pulsed and the measurements made, the subsurface well logging instrument is continuously pulled up through the borehole. This makes it possible to evaluate formation characteristics over a range of depths.

Depending on the material composition of the earth formations proximal to the instrument, the thermal neutrons can be absorbed, or "captured", at various rates by certain types of atomic nuclei in the earth formations. When one of these atomic nuclei captures a thermal neutron, it emits a gamma ray, which is referred to as a "capture gamma ray".

Prior art methods exist for determining attributes of a formation from logging results. See, for example, U.S. Pat. No. 4,712,424, to Herron, U.S. Pat. No. 4,394,574, to Grau et al., U.S. Pat. No. 4,390,783, to Grau, SPE 7430 of Hertzog, SPE9461 by Westaway et al., and U.S. Pat. No. 5,471,057, to Herron.

In the exploration for and production of hydrocarbons, it is essential to analyze the geological basin involved. In determining the hydrocarbon generation potential of an area, source rocks (i.e. any rock capable of producing hydrocarbons) must be identified, along with volume of the rock and the quantities of organic matter contained therein. Identification of the presence of source rock is usually critical in deciding whether to continue drilling a well or to abandon it. U.S. Pat. No. 4,071,755 to Supernaw discloses a method in which the energy spectrum of natural gamma radiation occurring in earth formations penetrated by a well borehole is observed in energy regions corresponding to uranium, potassium and thorium. Quantitative evaluations of the relative abundances of these elements are made by comparing the observed spectra with standard gamma ray spectra. The relative abundances of these elements may then be interpreted in terms of the organic carbon content of earth formations by comparison with predetermined relationships found to exist therebetween. U.S. Pat. No. 4,686,364 to Herron et al. discloses a method for determining in situ the carbon content of a source rock comprises determining the carbon/oxygen elemental ratio of the formation via inelastic gamma spectroscopy, determining the porosity of the formation, obtaining the oxygen contents and densities of the fluid and minerals in said formation, and determining the carbon content from said carbon/oxygen ratio, and said oxygen contents and densities of the fluid and minerals. The present disclosure is directed towards a method of determining the organic content of a formation using only nuclear instruments.

SUMMARY OF THE DISCLOSURE

One embodiment of the disclosure is a method of estimating an organic carbon content of an earth formation. Radiation resulting from interaction of irradiation from a source with nuclei in the earth formation is measured. The measured radiation is analyzed to obtain an elemental composition (including carbon) of the formation. The inorganic carbon associated with the other elements in known minerals is estimated and the organic carbon is obtained as the difference between the total carbon and the inorganic carbon. The elements identified in the elemental composition may include Ca, Mg, Mn and Fe. The known minerals may include calcite, dolomite, siderite, rhodochrosite and clay minerals. NMR, acoustic, porosity and/or resistivity measurements may further be made to estimate the carbon that is present in the pore spaces of the earth formation. The difference between the hydrocarbon in the pore space and the excess hydrocarbon is indicative of organic carbon in the formation. The organic carbon may include carbon in oil, gas, bitumen, coal and/or biogenic matter. The method may also include characterizing the organic carbon as a source rock using a Th/U ratio. The Th/U ratio may be determined by making measurements of natural gamma radiation.

Another embodiment of the disclosure is an apparatus for evaluating an earth formation. A radiation source on a logging tool in a borehole is configured to the earth formation. At least one detector on the logging tool is configured to measure radiation resulting form interaction of irradiation with nuclei in the earth formation. A processor is configured to analyze the measured radiation to obtain an elemental composition (including carbon) of the formation. The processor is further configured to estimate inorganic carbon associated with the other elements in known minerals, and estimate total organic carbon as the difference between the total carbon and the inorganic carbon. The elements identified in the elemental composition may include Ca, Mg, Mn and Fe. The known minerals may include calcite, dolomite, siderite, rhodochrosite and clay minerals. The apparatus may further include NMR, acoustic, porosity and/or resistivity sensors, the output of which may further be further used by the processor to estimate the carbon that is present in the pore spaces of the earth formation. The processor may then be configured to use the difference between the carbon in pore spaces and the total organic carbon as an estimate of organic carbon in the formation. The organic carbon may include carbon in oil, gas, bitumen, coal and/or biogenic matter. The processor may be further configured to categorize the organic carbon as a source rock using a Th/U ratio. The apparatus may include a natural gamma ray detector configured to make measurements that are used by the processor to determine the Th/U ratio.

Another embodiment of the disclosure is a computer-readable medium for use with an apparatus for evaluating an earth formation. The apparatus includes a radiation source on a logging tool in a borehole which irradiates the earth formation. At least one detector on the logging tool measures radiation resulting from interaction of irradiation with nuclei in the earth formation. The medium provides instructions that enable a processor to analyze the measured radiation to obtain an elemental composition (including carbon) of the formation, estimate inorganic carbon associated with the other elements in known minerals, and estimate organic carbon as the difference between the total carbon and the associated carbon. The medium may be selected from the group consisting of (i) a ROM, (ii) an EPROM, (iii) an EEPROM, (iv) a Flash Memory, and (v) an Optical disk.

BRIEF DESCRIPTION OF THE DRAWINGS

The present disclosure is best understood with reference to the accompanying figures in which like numerals refer to like elements and in which.

DETAILED DESCRIPTION OF THE DISCLOSURE

Figure 1:
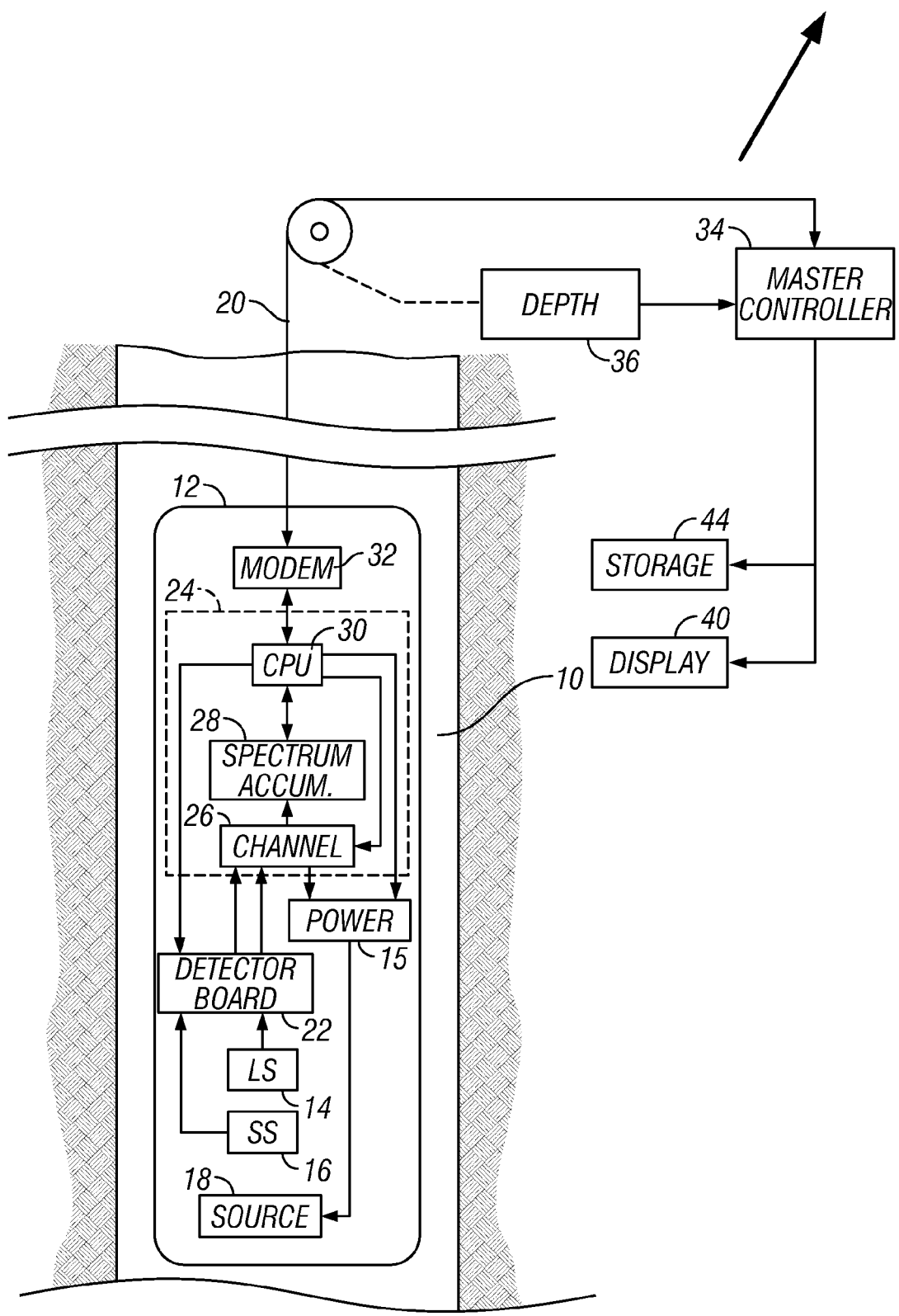
FIG. 1 illustrates a nuclear well logging configuration in accordance with the present disclosure.

Referring now to the drawings in more detail, and particularly to FIG. 1, there is illustrated a nuclear well logging configuration in accordance with the present disclosure. Well 10 penetrates the earth's surface and may or may not be cased depending upon the particular well being investigated. Disposed within well 10 is subsurface well logging instrument 12. The system diagrammed in FIG. 1 is a microprocessor-based nuclear well logging system using multi-channel scale analysis for determining the timing distributions of the detected gamma rays. Well logging instrument 12 includes long-spaced (LS) detector 14, short-spaced (SS) detector 16 and pulsed neutron source 18. In an exemplary embodiment, LS and SS detectors 14 and 16 are comprised of bismuth-germanate (BGO) crystals coupled to photomultiplier tubes. To protect the detector systems from the high temperatures encountered in boreholes, the detector system may be mounted in a Dewar-type flask. Also, in an exemplary embodiment, source 18 comprises a pulsed neutron source using a D-T reaction wherein deuterium ions are accelerated into a tritium target, thereby generating neutrons having an energy of approximately 14 MeV. The filament current and accelerator voltage are supplied to source 18 through power supply 15. Cable 20 suspends instrument 12 in well 10 and contains the required conductors for electrically connecting instrument 12 with the surface apparatus.

The outputs from LS and SS detectors 14 and 16 are coupled to detector board 22, which amplifies these outputs and compares them to an adjustable discriminator level for passage to channel generator 26. Channel generator 26 converts the output pulse heights to digital values, which are accumulated into pulse height spectra, in which the pulses are sorted according to their amplitudes into a discrete array of bins. The bins uniformly divide the entire amplitude range. These pulse height spectra are accumulated in registers in the spectrum accumulator 28, the spectra being sorted according to their type: inelastic, capture, or background. After a pulse height spectrum has been accumulated, CPU 30 controls the transfer of the accumulated data to the modem 32, which is coupled to cable 20 for transmission of the data over a communication link to the surface apparatus. To be explained later are further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. An input terminal may be coupled to master controller or processor 34 to allow the system operator to provide selected input into master controller 34 for the logging operation to be performed by the system. Display unit 40, and storage unit 44 coupled to the master controller 34 may be provided. The data may also be sent by a link to a remote location. Processing may be done either by the surface processor, at the remote site, or by a downhole processor.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 10,000 bursts/second (10 kHz). This, in turn, causes a burst of high-energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 14 and 16. As each gamma ray thus impinges upon the crystal-photomultiplier tube arrangement of the detectors, a voltage pulse having an amplitude functionally related to the energy of the particular gamma ray is delivered to detector board 22. It will be recalled that detector board 22 amplifies each pulse and compares them to an adjustable discriminator level, typically set at a value corresponding to approximately 100 keV. If such pulse has an amplitude corresponding to an energy of at least approximately 100 keV, the voltage pulse is transformed into a digital signal and passed to channel generator 26 of MCS section 24.

Figure 2:
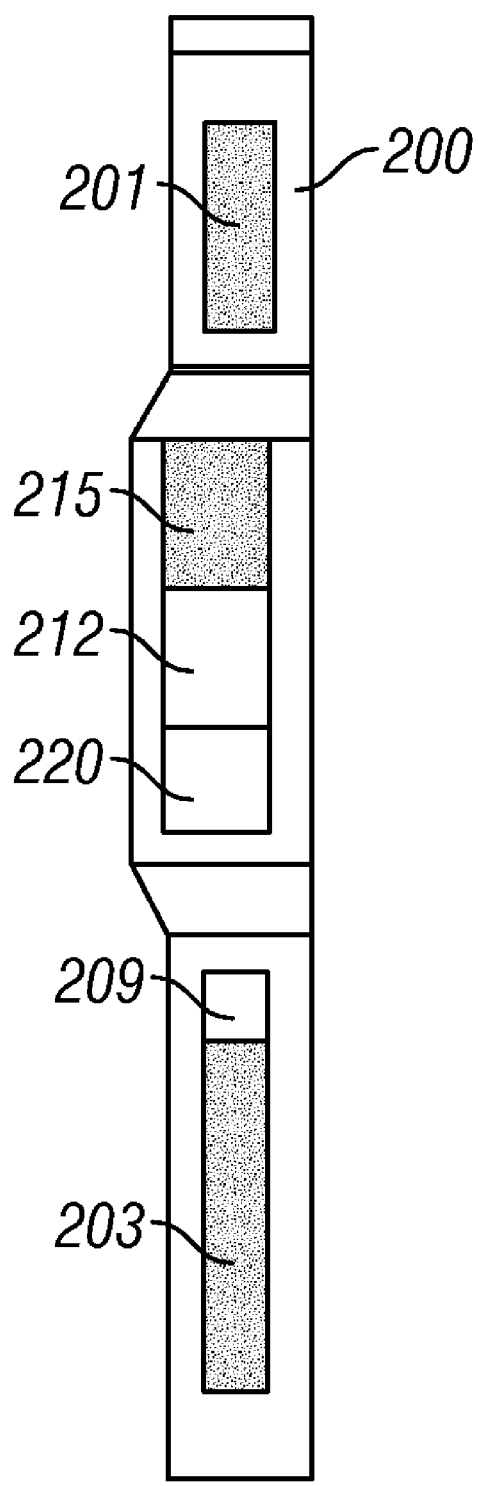
FIG. 2 shows an instrument suitable for use with the present disclosure.

FIG. 2 illustrates a schematic diagram of an instrument suitable for use with the present disclosure. The Elemental Neutron Spectrometer (ENS™) is a wireline instrument designed to provide formation mineralogical information, shale identification, and clay typing. The enhanced mineralogical data obtained from the ENS also enables enhanced porosity measurements. The present disclosure is usable in open hole wireline logging. In a typical embodiment, the present disclosure uses the ECLIPS™ acquisition system of Baker Hughes Incorporated. Alternatively, the present disclosure can be used, for example, with the FOCUS system of Baker Hughes, Incorporated. Also, under most conditions, the ENS can be run in combination with Gamma Ray/Spectralog, Neutron, and Density nuclear tools. The ENS utilizes an axial pulsed neutron generator of the same type as that used in the reservoir performance monitor instruments. Thus, there are no special storage or transportation requirements except those of a regulatory nature associated with pulsed neutron generators. The logging speed is dependent upon the environment. A typical logging speed is in the range of 15-30 ft/min.

The ENS measurement device of FIG. 2 employs the principle of neutron-induced gamma ray spectroscopy. ENS component parts are encapsulated within wireline device casing 200. The neutron source of the present disclosure is typically a pulsed neutron source. The use of a pulsed neutron source is advantageous over the use of a chemical neutron source due to its ability to operate over a broader range of frequencies. Neutron source 209 discharges high-energy bursts of neutrons into the surrounding formation. The electronic pulsed neutron generator is typically operated at a rate of approximately 10,000 Hz, so that each burst takes place within a 100 microsecond window. Gamma rays produced via interaction of the discharged neutrons and the formation are detected at the scintillation detector 212 attached to acquisition and telemetry electronics 215. Power supply 201 enables the ENS device. Electronics 203 enables the neutron source. A neutron shield 220 attenuates the neutron flux propagating directly from the source to the detector.

Figure 3:
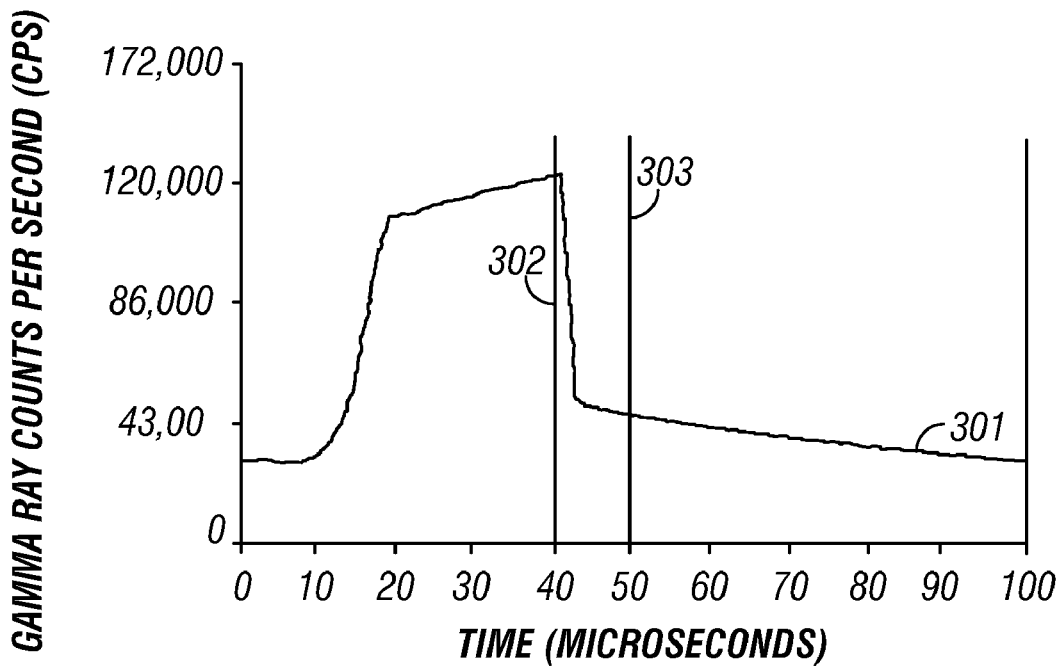
FIG. 3 shows the basic timing of the pulsed neutron source and the produced gamma rays.

FIG. 3 illustrates the basic timing of the pulsed neutron source and the produced gamma rays. Time is displayed along the x-axis in microseconds. The gamma ray counts per second (cps) is displayed along the y-axis. The neutron burst defines a first-detector-gate interval, referred to as the "burst gate" or inelastic gate. Typically a total spectrum of gamma rays resulting from both inelastic neutron scattering and capture gamma ray scattering are produced during the active duration of the neutron source, and the timing of the inelastic gate enables obtaining the total spectrum. In the example of FIG. 3, the number of counts rises significantly (typically to 120 kcps) during the inelastic gate, which extends approximately from 10 μsec to 40 μsec. The deactivation of the neutron source causes the inelastic gamma rays to disappear from the count almost immediately. A "background gate" 302-303 is shown at a point substantially coincident with deactivation of the neutron source. The background gate of FIG. 3 extends approximately from 40 μsec to 50 μsec. The counts obtained during the background gate are attributable to background gamma rays, but also to capture gamma rays, which make up a significant portion of the spectrum during the background gate. The background gate is followed by a "capture gate" 301. The capture gate contains gamma rays substantially due to captured neutrons of the surrounding formation.

In an exemplary embodiment of the present disclosure, energized neutrons are injected from a pulsed neutron source 209 into a surrounding formation. The scintillation detector records the spectrum over a predetermined time interval. During the inelastic gate, a total spectrum of gamma rays is obtained from the formation layer. During a capture gate, a capture spectrum of gamma rays is obtained from the formation layer. A determinable factor of the capture spectrum can be subtracted from the obtained total spectrum to derive a spectrum substantially representative of an inelastic spectrum only. The elemental contribution to the inelastic spectrum and the capture spectrum can then be determined by determining a first constituent spectrum from the inelastic spectrum and a second constituent spectrum from the capture spectrum. An operator versed in the arts can then use the determined elemental contributions to determine a parameter of the surrounding formation.

Figure 4:
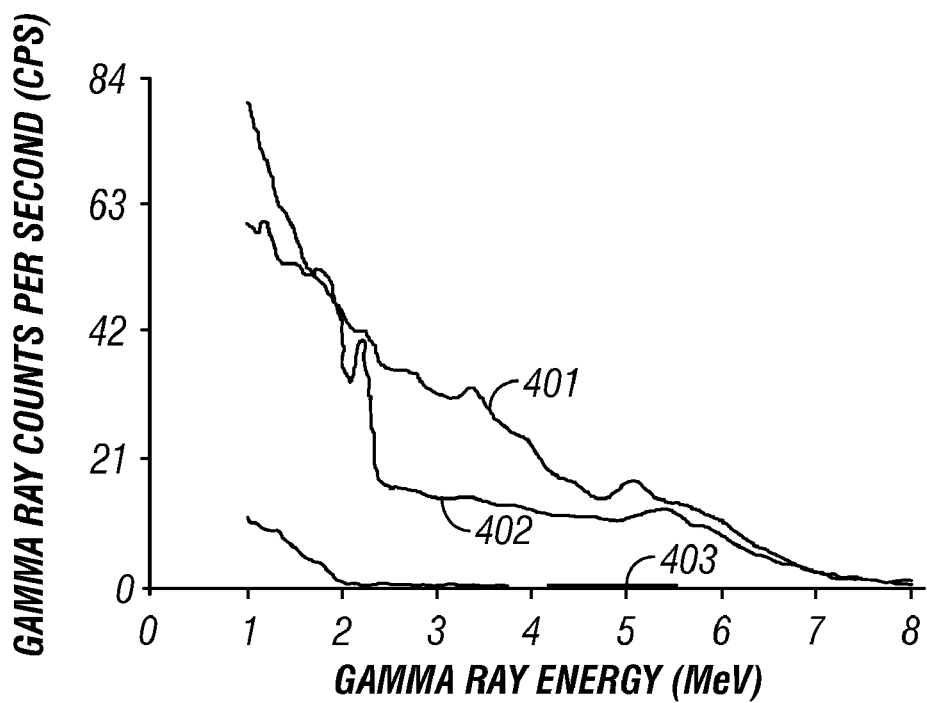
FIG. 4 shows capture and inelastic spectra from limestone formation with oil-filled borehole.

The derived gamma ray energy spectra for data analysis comprise both the capture spectrum and the inelastic spectrum. An inelastic gamma ray is generated from the nucleus of the atom from which there is a scattering of initial highly energetic neutrons. A capture gamma ray is emitted by the nucleus of an atom through absorption of a neutron after its energy has diminished. FIG. 4 shows capture and inelastic spectra from limestone formation with oil-filled borehole. The three spectra are the inelastic spectrum 401, the capture spectra 402, and the background spectrum 403.

A feature of the present disclosure is the analysis of separate inelastic and capture spectra in terms of their constituent spectra. Prior art discusses methods for removing the effects of a capture spectrum from a total spectrum obtained during a burst gate, consequently obtaining an improved inelastic spectrum. A corrected fraction of the capture spectrum is subtracted from the total spectrum in order to generate a representative inelastic spectrum. The corrected fraction is referred to as the capture subtraction factor. The method for calculating this value comprises using a capture gamma ray response function to estimate the capture and inelastic components within a recorded time spectrum. Analysis of the spectra can be performed uphole or downhole using a processor or expert system.

A library of elemental basis functions can be used to enable a decomposition of at least one of capture and inelastic spectra into their respective constituent spectra. A partial list of elements includes Ca, Cl, Fe, Mg, Si. Currently, constituent spectra representing 20 elements are usable in the present disclosure. When the fraction of a particular element obtained from both the capture and inelastic spectrum are reasonably close, then their average value may be used for the elemental analysis. Large differences between estimates for a particular element obtained by capture and inelastic spectral decomposition should serve as a cautionary flag. As part of the spectral decomposition using basis functions, it is standard practice to also estimate uncertainties along with the regression coefficients. These uncertainties can be used to provide an estimate of the amount of an element from the individual estimates obtained from inelastic and capture spectra. The number of elements can be increased and is not meant as a limitation of the present disclosure. Elemental basis functions could further be produced using various methods. For example, use of a computer can enable generation of an elemental basis function of a previously unlisted element.

The elements that can be readily measured from the capture gamma ray energy spectrum comprise Ca, Cl, H, Fe, Mg, Si, and S. The elements that can be readily measured from the inelastic gamma ray energy spectrum comprise C, Ca, Fe, Mg, O, Si, and S. The list is not intended to be complete and other elements could also be identified. Table 1 summarizes the appearance of several elements readily identifiable in both capture and inelastic spectra. In some cases, the same element can be found in both the capture and inelastic spectra. Those elements found in both the capture and inelastic spectra further aid a log analyst in the final scientific interpretation of the data.

TABLE 1

| Element | Capture Spectrum | Inelastic Spectrum |
| --- | --- | --- |
| Carbon | | C |
| Calcium | Ca | Ca |
| Chlorine | Cl | |
| Hydrogen | H | |
| Iron | Fe | Fe |
| Magnesium | Mg | Mg |
| Oxygen | | O |
| Silicon | Si | Si |
| Sulfur | S | S |

Once a gamma ray spectrum is extracted for an individual element, it can be used as an elemental standard. These standards are determinable, for example, using a combination of empirical data from known formations in the Nuclear Instrument Characterization Center, and using computer simulations employing detailed physical modeling techniques. The combination of these standards that results in the best fit to the measured spectra determines the elemental yields.

In the present disclosure, capture and inelastic spectra are used for estimating the Calcium and Magnesium content of earth formations. Some drilling muds include Ca and/or Mg minerals, so that correction to the gamma ray spectra resulting from Ca and/or Mg in the borehole may be preferable and a dual detector system may be used. Other drilling muds do not include Mg, so that measurements from a single detector are sufficient to establish the Mg in the earth formation.

One method of the present disclosure makes use of the fact that Ca and Mg most commonly occur in earth formations in the form of calcite (limestone) or dolomite, both of which are carbonate rocks. The term dolomite is used with reference to rocks in which half the Ca atoms of calcite have been replaced by Mg atoms. The amount of C that is present in calcite and dolomite bears a fixed relation to the amount of Ca and Mg in the formation. This is also true of partially dolomitized limestone in which less than half of the Ca in the limestone has been replaced by Mg. To a lesser extent, Mg and Ca may also occur in some clay minerals. For the purposes of the present disclosure, we define the Organic Carbon (XSC) as the carbon that is not in the carbonate minerals. The term "carbonate minerals" includes other minerals such as siderite (iron carbonate) and rhondochrosite (manganese carbonate).

The relation between the fraction of XSC and the fractions of C, calcite and dolomite in the earth formation is given by $$f_{XSC} = f_C - af_{calcite} - bf_{dolomite} \qquad (1).$$

The coefficients a and b have values of 0.12 and 0.1303 respectively. The terms $af_{calcite} + bf_{dolomite}$ may be referred to as "associated carbon" that is associated in a mineral form with other elements in the earth formation. The method can be extended to include other minerals containing Ca or Mg. Most of the other such minerals are clay minerals whose presence can be quantified, for example, by natural gamma ray logs.

The Organic Carbon as defined here has two main components. The first is the carbon that is present in the form of hydrocarbons in the pore-spaces. The second is in the form of carbon that is in the form of a source rock. The hydrocarbons in the pore space can be estimated using other measurements such as NMR logs, porosity logs, acoustic logs and/or resistivity logs using known methods. For use of NMR, see, for example, U.S. Pat. No. 6,952,764 to Chen et al., having the same assignee as the present disclosure and the contents of which are incorporated herein by reference. Porosity may be determined from neutron porosity logs or from acoustic logs; combining this with resistivity logs can give hydrocarbon saturation and hence carbon content. Thus, it is possible to further get an estimate of the source rock potential of the formations.

Figure 5:
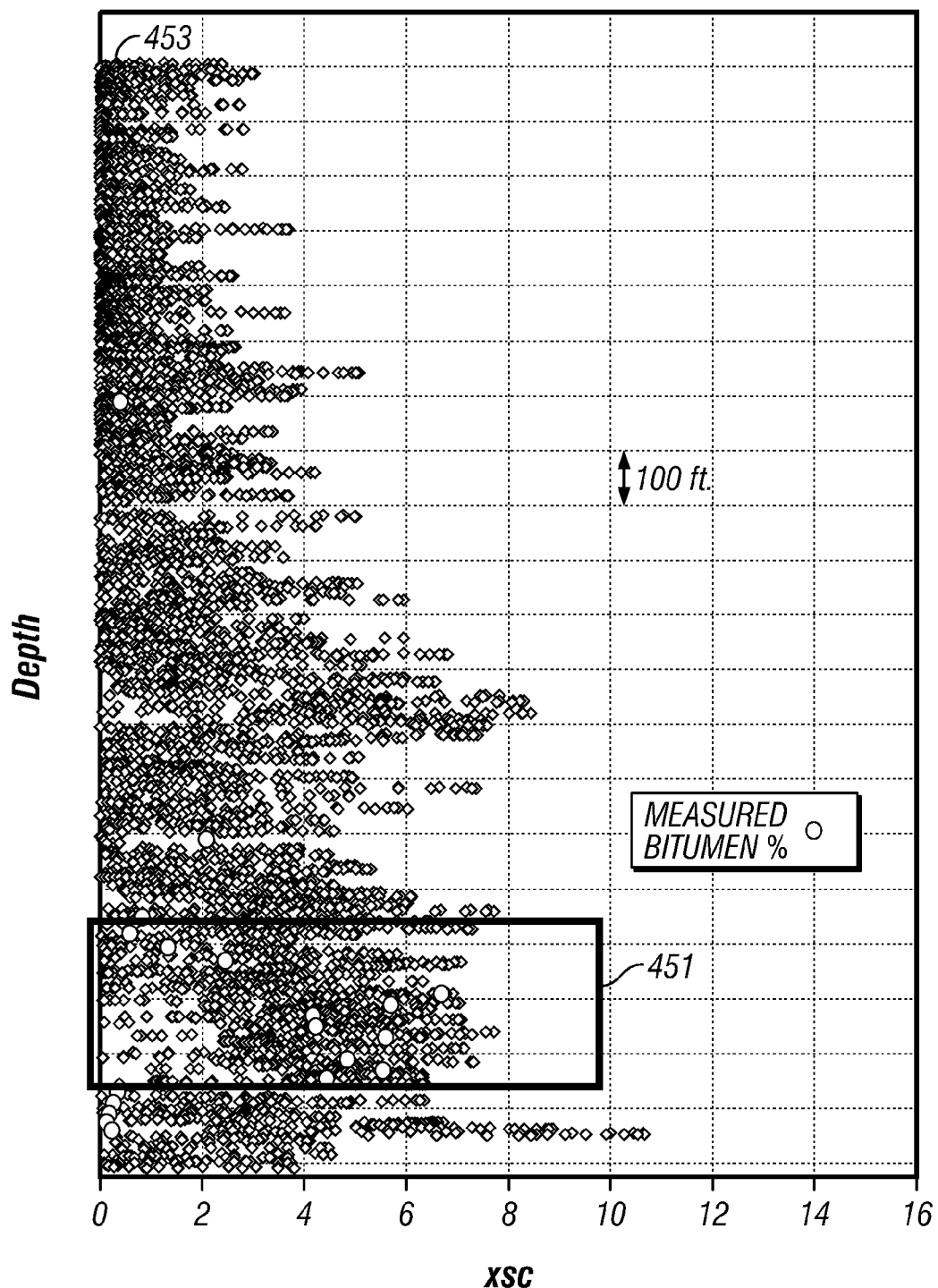
FIG. 5 shows a comparison of the results of the method of the present disclosure with core measurements.

FIG. 5 gives an exemplary log obtained using the method of the present disclosure. The points denoted by 453 are estimates of XSC over a depth range of 2100 ft (640 m) in a well using the method described above. The depth interval included in the box 451 includes a source rock and is in a formation called the Barnett shale. The points within the box and at a few other depths are estimates of organic carbon from analysis of core samples. The Organic Carbon estimates from analysis of gamma ray spectra are consistent with the core measurements. It should be noted that the organic carbon includes oil, gas, bitumen, coal and other biogenic matter. It should be noted that any graphite in the formation will also show up in the estimate of organic carbon.

Another embodiment of the disclosure makes use of a natural gamma ray logging tool to further characterize the carbon in the earth formation. As would be known to those versed in the art, natural gamma ray tool measures gamma rays emitted by natural decay of radioactive nuclei in the earth formation. The most common radioactive elements are potassium (K), thorium (Th) and uranium (U). As noted in the U.S. Pat. No. 4,585,939 to Arnold et al., characteristic energies for thorium, uranium and potassium are 2.61 Mev, 1.76 Mev and 1.46 Mev respectively.

It is known in the art that U and Th can be used as indicators of sedimentary processes. See, for example, *Adams and Weaver* (AAPG 1958). To summarize, in oxidizing conditions, only uranium can assume a more soluble form whereas the mobility of thorium is limited to mechanical means. Thus, a high Th/U value indicates uranium leaching in oxidizing conditions, commonly found in terrestrial environments, while a low Th/U value indicates uranium fixation due to reducing conditions which are found in marine environments.

Figure 6:
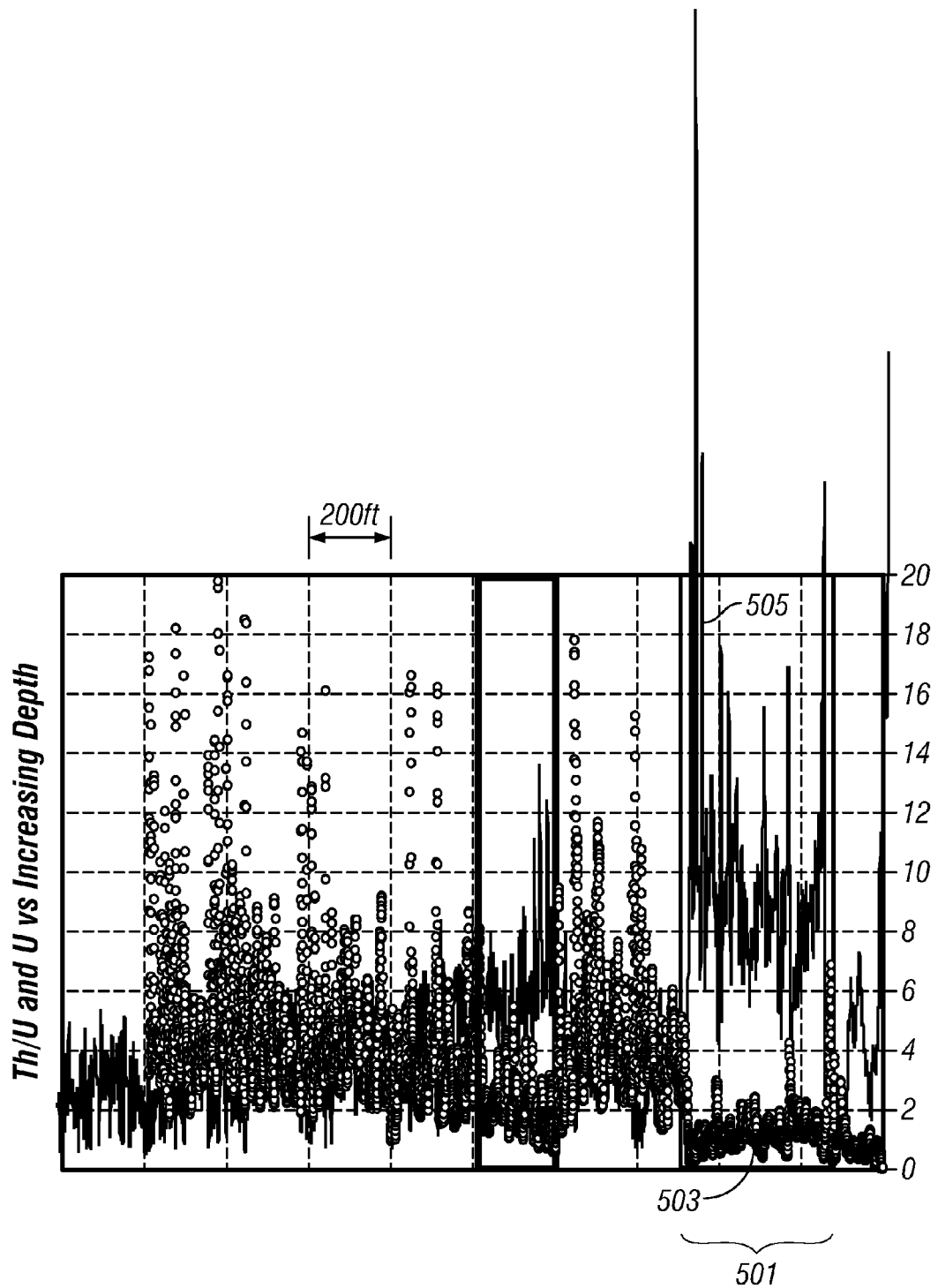
FIG. 6 shows a Th/U ratio derived from natural gamma ray measurements.

An important aspect of the present disclosure is the recognition that a low Th/U value is indicative not just of sedimentary processes but also of organic source rock. This is discussed with reference to FIG. 6, which shows a plot of the Th/U ratio in a well. The zone indicated by 501 is a prolific source rock. This is a deep-water shale and the low Th/U 503 is striking. The curve 505 is the uranium measurement.

It should be noted that the Th/U ratio alone cannot be used to measure the actual amount of source rock. It should be used in conjunction with the excess carbon using the method discussed above. Excess carbon in sedimentary strata could be related to coal, to petroleum hydrocarbons in the pores of a rock or it could be related to the organic matter composing a source rock. Thus, in order to determine these occurrences, the Th/U ratio is used to determine when excess carbon is either attributed to a source rock versus excess carbon associated with hydrocarbon or coal. The Th/U ratio of 2 or below in the presence of excess carbon is indicative of carbon associated with a source rock. Uranium because of its redox properties will become concentrated due to its affinity for organic matter in anoxic reducing conditions, and exceed the concentration of Th adsorbed to clays composing source rocks. A Th/U above 2 is indicative of excess carbon which is associated with petroleum hydrocarbons and coal because Th/U ratios above two shows oxidizing conditions are prevalent thus uranium becomes soluble and mobile and is readily removed whereas Th which is not redox sensitive will remain. Th/U ratio by itself cannot be used to determine whether a source rock is present unless there is evidence of excess carbon computed using the method described above. Another example of this is the Th/U ratio found in Limestone and Dolomite. The ratio is often found to be below 2, but is unrelated to excess carbon being present. It is related to the fact that these trace elements are very low in concentration in carbonate lithologies anyway. Thus one can see that Th/U ratio used by itself could be misrepresentative if source rocks are present or not.

The disclosure has been described in terms of measurements made using logging tools conveyed on a wireline device in a borehole. The term downhole assembly is intended to include a bottomhole assembly as well as a logging string conveyed on a wireline. The method can also be used using data obtained by sensors conveyed on a slickline. The method can also be used on data obtained using measurement-while-drilling sensors conveyed on a drilling tubular. The processing of the data may be done downhole using a downhole processor or at the surface with a surface processor. It is also possible to store at least a part of the data downhole in a suitable memory device, in a compressed form if necessary. Upon subsequent retrieval of the memory device during tripping of the drillstring, the data may then be retrieved from the memory device and processed uphole.

Implicit in the processing of the data is the use of a computer program on a suitable machine-readable medium that enables the processor to perform the control and processing. The machine-readable medium may include ROMs, EPROMs, EEPROMs, Flash Memories and Optical disks.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. A method of estimating organic carbon in an earth formation, the method comprising:
   irradiating the earth formation from within a borehole;
   estimating a spectrum of radiation resulting from interaction of the irradiation with the earth formation-and analyzing the estimated spectrum to estimate an elemental composition of the formation including carbon and at least one other element;
   using:
   (A) an estimated amount of total carbon in the elemental composition, and
   (B) an amount of inorganic carbon associated with the at least one other element in a known mineral in the earth formation;
   to make a first estimate of the amount of organic carbon;
   making a second estimate of the amount of organic carbon using the first estimate of the amount of organic carbon and an estimate of carbon present in a pore space of the formation; and
   recording the second estimate of the amount of organic carbon on a suitable medium.

2. The method of claim 1 wherein the at least one other element is selected from the group consisting of (i) Calcium, (ii) Magnesium, (iii) Iron, and (iv) Manganese.

3. The method of claim 1 wherein the known mineral is at least one of (i) calcite, (ii) dolomite, (iii) siderite and (iv) rhodochrosite.

4. The method of claim 1 further comprising:
   using an additional measurement made with a formation evaluation sensor for
   estimating carbon present in the space of the earth formation.

5. The method of claim 4 wherein making the additional measurement further comprises using at least one of: (i) a nuclear magnetic resonance tool, (ii) an acoustic tool, (iii) a neutron porosity tool, and (iv) a resistivity tool.

6. The method of claim 4 further comprising using a Th/U ratio to characterize the organic carbon as a source rock.

7. The method of claim 6 further comprising determining the Th/U ratio by making measurements of natural gamma radiation.

8. The method of claim 1 wherein the organic carbon includes at least one of: (i) oil, (ii) gas, (iii) bitumen, (iv) coal, and (v) biogenic matter.

9. The method of claim 1 wherein irradiating the earth formation further comprises using a pulsed neutron source.

10. The method of claim 1 wherein the radiation resulting from the interaction further comprises gamma rays.

11. An apparatus configured to estimate organic carbon in an earth formation, the apparatus comprising:
- a radiation source configured to irradiate the earth formation from within a borehole;
- a radiation detector configured to record radiation resulting from interaction of the irradiation with the earth formation; and
- a processor configured to:
  - estimate a spectrum of the recorded radiation;
  - analyze the estimated spectrum to estimate an elemental composition of the earth formation including carbon and at least one other element;
  - estimate an amount of total carbon in the elemental composition;
  - estimate an amount of inorganic carbon associated with at least one other element in a known mineral in the earth formation;
  - make a first estimate of the amount of organic carbon from the estimated amount of total carbon and the amount of associated inorganic carbon;
  - make a second estimate of the amount of organic carbon using the first estimate of the amount of organic carbon and an estimate of the carbon in a pore space of the formation; and record the estimate of the amount of organic carbon on a suitable medium.

12. The apparatus of claim 11 wherein the at least one other element is selected from the group consisting of (i) Calcium, (ii) Magnesium, (iii) Iron, and (iv) Manganese.

13. The apparatus of claim 11 wherein the known mineral is at least one of (i) calcite, (ii) dolomite, (iii) siderite and (iv) rhodochrosite.

14. The apparatus of claim 11 further comprising a formation evaluation sensor configured to make a measurement indicative of carbon present in a pore space of the earth formation and wherein the processor is further configured to estimate the amount of carbon present in the pore space of the earth formation using the measurement of the formation evaluation sensor.

15. The apparatus of claim 14 wherein the formation evaluation sensor comprises at least one of: (i) a nuclear magnetic resonance tool, (ii) an acoustic tool, (iii) a neutron porosity tool, and (iv) a resistivity tool.

16. The apparatus of claim 14 wherein the processor is further configured to use a Th/U ratio to characterize the organic carbon as a source rock.

17. The apparatus of claim 16 further comprising a natural gamma ray tool configured to make a measurement indicative of the Th/U ratio.

18. The apparatus of claim 11 wherein the organic carbon includes at least one of: (i) oil, (ii) gas, (iii) bitumen, (iv) coal, and (v) biogenic matter.

19. The apparatus of claim 11 further comprising a pulsed neutron source configured to irradiate the formation.

20. The apparatus of claim 11 further comprising a gamma ray detector configured to record the radiation resulting from the interaction.

21. The apparatus of claim 11 wherein the radiation source is configured to be disposed on a downhole assembly conveyed into the borehole on a conveyance device selected from: (i) a wireline, and (ii) a drilling tubular.

22. A computer-readable medium accessible to a processor, the computer-readable medium having instructions which enable the processor to:
- estimate a spectrum of recorded radiation resulting from interaction of irradiation from a radiation source within a borehole with an earth formation;
- analyze the estimated spectrum to estimate an elemental composition of the earth formation including carbon and at least one other element;
- estimate an amount of total carbon in the elemental composition;
- estimate an amount of inorganic carbon associated with the at least one other element in a known mineral in the earth formation;
- make a first estimate of the amount of organic carbon from the estimated amount of total carbon and the amount of associated inorganic carbon;
- make a second estimate of the amount of organic carbon using the first estimate of the amount of organic carbon and an estimate of the amount of carbon in a pore space of the formation; and
- record the second estimate of the amount of organic carbon on a suitable medium.

23. The computer-readable medium of claim 22 further comprising at least one of (i) a ROM, (ii) an EPROM, (iii) an EAROM, (iv) a flash memory, and (v) an optical disk.

* * * * *